United States Patent
Redzic et al.

(10) Patent No.: US 11,889,382 B2
(45) Date of Patent: Jan. 30, 2024

(54) TRAJECTORY MATCHING BASED ON USE OF QUALITY INDICATORS EMPOWERED BY WEIGHTED CONFIDENCE VALUES

(71) Applicant: HUAWEI TECHNOLOGIES CO., LTD., Guangdong (CN)

(72) Inventors: Milan Redzic, Munich (DE); Christos Laoudias, Munich (DE); Gaohu Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/231,856

(22) Filed: Apr. 15, 2021

(65) Prior Publication Data
US 2021/0235232 A1 Jul. 29, 2021

Related U.S. Application Data

(63) Continuation of application No. PCT/EP2018/078247, filed on Oct. 16, 2018.

(51) Int. Cl.
*H04W 4/029* (2018.01)

(52) U.S. Cl.
CPC .................. *H04W 4/029* (2018.02)

(58) Field of Classification Search
CPC ....... H04W 4/02; H04W 4/029; G01S 5/0054; G01S 5/0063; G01S 19/13; G01S 19/14;
(Continued)

(56) References Cited

U.S. PATENT DOCUMENTS 6,449,558 B1   9/2002  Small
6,622,090 B2 * 9/2003  Lin ...................... G01C 21/165
                                                        701/472
(Continued)

FOREIGN PATENT DOCUMENTS

CN   104501807 A   4/2015
CN   104657746 A   5/2015
(Continued)

OTHER PUBLICATIONS

Wang et al., "Research on the MR Locating Based on the OTT Method," Telecom Engineering Technics and Standardization, Oct. 2016, 4 pages (with English abstract).
(Continued)

*Primary Examiner* — Siu M Lee
(74) *Attorney, Agent, or Firm* — Fish & Richardson P.C.

(57) ABSTRACT

A system for iteratively matching a plurality of spatiotemporal trajectories of a plurality of users is provided. The system comprises at least one processor, being configured for: receiving a plurality of first spatiotemporal trajectories and a plurality of second spatiotemporal trajectories each generated based on location data. Using a quality classifier for classifying the plurality of first spatiotemporal trajectories into first low quality trajectories and first high quality trajectories and the plurality of second spatiotemporal trajectories into second low quality trajectories and second high quality trajectories the processor identifies a plurality of high quality trajectories pairs and a plurality of low quality pairs; associating to each pairs with a confidence value indicative of a disparity; adjusting the confidence values and re-inputting into the quality classifier all spatiotemporal trajectories which are part of a low quality pair or a high quality trajectories pair whose adjusted confidence value is below the threshold.

20 Claims, 7 Drawing Sheets

(58) Field of Classification Search
CPC .. G01S 19/393; G01S 19/396; G06Q 10/0833
See application file for complete search history.

(56) References Cited

U.S. PATENT DOCUMENTS

| | | | |
|---|---|---|---|
| 2003/0023595 | A1 | 1/2003 | Carlbom et al. |
| 2007/0010940 | A1 | 1/2007 | Tan et al. |
| 2010/0332125 | A1 | 12/2010 | Tan et al. |
| 2011/0164562 | A1* | 7/2011 | Qiu .................... H04W 72/543 370/328 |
| 2011/0301832 | A1 | 12/2011 | Zheng et al. |
| 2015/0310137 | A1 | 10/2015 | O'Donncha et al. |
| 2015/0312722 | A1 | 10/2015 | Mori et al. |
| 2017/0286781 | A1 | 10/2017 | Xu et al. |
| 2017/0358208 | A1* | 12/2017 | Kazemi .................. G08G 1/144 |

FOREIGN PATENT DOCUMENTS

| | | |
|---|---|---|
| CN | 105321380 A | 2/2016 |
| CN | 106461768 A | 2/2017 |
| CN | 107679558 A | 2/2018 |
| CN | 107807346 A | 3/2018 |
| CN | 108133172 A | 6/2018 |
| CN | 108346158 A | 7/2018 |
| JP | 2012007939 A | 1/2012 |
| WO | 2012033807 A1 | 3/2012 |
| WO | 2013148940 A1 | 10/2013 |
| WO | 2018150227 A1 | 8/2018 |

OTHER PUBLICATIONS

Office Action in Chinese Appln. No. 201880006700.8, dated Jan. 19, 2023, 6 pages.

Chen et al., "On the Marriage of Lp-norms and Edit Distance," 30th International Conference on Very Large Databases, vol. 30, Aug. 2004, 12 pages.

Chen et al., "Robust and Fast Similarity Search for Moving Object Trajectories," 2005 ACM SIGMOD International Conference on Management of Data, Jun. 2005, 12 pages.

Keogh et al., "Dimensionality Reduction for Fast Similarity Search in Large Time Series Databases," Knowledge and Information Systems (KAIS), vol. 3, No. 3, Aug. 2011, 19 pages.

Keogh et al., "On the Need for Time Series Data Mining Benchmarks: A Survey and Empirical Demonstration," 8th ACM SIGKDD International Conference on Knowledge Discovery and Data Mining, Jul. 2002, 23 pages.

Keogh et al., "Locally Adaptive Dimensionality Reduction for Indexing Large Time Series Databases," 2001 ACM SIGMOD International Conference on Management of Data, May 2001, 12 pages.

PCT International Search Report and Written Opinion issued in International Application No. PCT/EP2018/078247 dated Jun. 4, 2019, 42 pages.

Popivanov et al., "Similarity Search Over Time Series Data Using Wavelets," 18th International Conference on Data Engineering, Feb. 2002, 10 pages.

Ratanamahatana et al., "Making Time-series Classification More Accurate Using Learned Constraints," 2004 SIAM International Conference on Data Mining, Apr. 2004, 12 pages.

Saygili et al., "Adaptive stereo similarity fusion using confidence measures," Computer Vision and Image Understanding, vol. 135, Jun. 2015, 14 pages.

Vlachos et al., "Discovering Similar Multidimensional Trajectories," 18th International Conference on Data Engineering, Feb. 2002, 12 pages.

Vlachos et al., "Indexing Multi-Dimensional Time-Series with Support for Multiple Distance Measures," Proceedings of the 9th ACM SIGKDD International Conference on Knowledge Discovery and Data Mining, Aug. 2003, 10 pages.

Zhu et al., "City-Scale Localization with Telco Big Data," Proceedings of the 25th ACM International on Conference on Information and Knowledge Management (CIKM '16), Oct. 2016, 10 pages.

* cited by examiner

TRAJECTORY MATCHING BASED ON USE OF QUALITY INDICATORS EMPOWERED BY WEIGHTED CONFIDENCE VALUES

CROSS-REFERENCE TO RELATED APPLICATIONS

This application is a continuation of International Patent Application No. PCT/EP2018/078247, filed on Oct. 16, 2018, the disclosure of which is hereby incorporated by reference in its entirety.

BACKGROUND

The present invention, in some embodiments thereof, relates to an improvement of trajectory matching of user based locations and, more specifically, but not exclusively, to an improvement of trajectory matching of user based locations based on confidence of trajectory matching.

Due to the ubiquity of localization technology, users now have the ability to keep a record of their own location, as a kind of 'location diary'. Such a large collection of data can become unmanageable without some way to structure that data. Localization methods using measurement report (MR) data from telecommunication networks (GSM, CDMA and LTE) have attracted intensive research interests in the telecommunications industry. MR based positioning systems have certain advantages when compared to global positioning system (GPS) based positioning, such as energy efficiency, availability, and improved network coverage. Therefore, MR based localization with Telco big data is a good complement to GPS for a better location based service experience without extra overhead. In addition, there are various potential applications based on MR big data analytics. Examples of such applications include assistive technologies for memory and visually impaired people, tourist oriented services that enhance user experience in museums and galleries, indoor/outdoor gaming, in-shop advertisements and coupon distributions, as well as health and daily life monitoring applications.

SUMMARY

It is an object of the present invention to provide a system and a method for spatiotemporal trajectory matching based on user location data.

The foregoing and other objects are achieved by the features of the independent claims. Further implementation forms are apparent from the dependent claims, the description and the figures.

According to a first aspect of the invention, a system is provided for iteratively matching a plurality of spatiotemporal trajectories of a plurality of users according to a threshold, the system comprising: at least one processor and a quality classifier, the at least one processor being configured to: receive a plurality of first spatiotemporal trajectories and a plurality of second spatiotemporal trajectories each generated based on location data gathered by a different tracking system; the quality classifier being configured to classify, the plurality of first spatiotemporal trajectories into first low quality trajectories and first high quality trajectories and the plurality of second spatiotemporal trajectories into second low quality trajectories and second high quality trajectories; identify a plurality of high quality trajectories pairs by matching between the first high quality trajectories and the second high quality trajectories; identify a plurality of low quality trajectories pairs by matching between the first low quality trajectories and the second low quality trajectories; associate to each of the plurality of low quality trajectories pairs and each of the plurality of high quality trajectories pairs with a confidence value indicative of a disparity of a respective pair; adjust the confidence values of at least some of the plurality of low quality trajectories pairs and the plurality of high quality pairs, and re-input into the quality classifier all spatiotemporal trajectories which are part of a low quality trajectories pair or a high quality trajectories pair whose adjusted confidence value is below the threshold.

According to a second aspect of the invention, a method for iteratively matching a plurality of spatiotemporal trajectories of a plurality of users according to a threshold, comprising: receiving a plurality of first spatiotemporal trajectories and a plurality of second spatiotemporal trajectories each generated based on location data gathered by a different tracking system; classifying, using a quality classifier, the plurality of first spatiotemporal trajectories into first low quality trajectories and first high quality trajectories and the plurality of second spatiotemporal trajectories into second low quality trajectories and second high quality trajectories; identifying a plurality of high quality trajectories pairs by matching between the first high quality trajectories and the second high quality trajectories; identifying a plurality of low quality trajectories pairs by matching between the first low quality trajectories and the second low quality trajectories; associating to each of the plurality of low quality trajectories pairs and each of the plurality of high quality trajectories pairs with a confidence value indicative of a disparity of a respective pair; adjusting the confidence values of at least some of the plurality of low quality trajectories pairs and the plurality of high quality pairs, and re-inputting into the quality classifier all spatiotemporal trajectories which are part of a low quality trajectories pair or a high quality trajectories pair whose adjusted confidence value is below the threshold.

In a first possible implementation of the first and second aspects of the present invention, optionally the processor is configured to output the plurality of high quality trajectories pairs, the plurality of low quality pairs, and respective confidence values.

In a further possible implementation of the first and second aspects of the present invention, optionally, the quality classifier classifies each of the plurality of first and second spatiotemporal trajectories by: computing for each of the plurality of first and second spatiotemporal trajectories their confidence values and respective shape descriptor scores; and using a predetermined heuristic to combine the shape descriptor scores for each of the plurality of first and second spatiotemporal trajectories.

In a further possible implementation of the first and second aspects of the present invention, the processor is further configured to adjust the plurality of confidence values by executing a machine learning process on the plurality of low quality trajectories pairs and the plurality of high quality trajectories pairs.

In a further possible implementation of the first and second aspects of the present invention, optionally, the machine learning process further comprises an iterative process of: using a classifier to classify the plurality of high and low quality trajectories pairs according to respective confidence values; adjusting the confidence values of the plurality of the high and low quality trajectories pairs according to the classifying; and checking a convergence condition on each adjusted confidence value, and when the convergence condition is met on all adjusted confidence values, outputting the adjusted confidence values.

In a further possible implementation of the first and second aspects of the present invention, the quality classifier is further configured to perform an evaluation of the first low quality trajectories by a first filter having a sequence of shape descriptor scores; and discarding some of the first low quality trajectories based on the evaluation.

In a further possible implementation of the first and second aspects of the present invention, the quality classifier is further configured to perform an evaluation of the second low quality trajectories by a second filter having a sequence of temporal data scores, and discarding some of the second low quality trajectories based on the evaluation.

In a further possible implementation of the first and second aspects of the present invention, optionally, identifying a plurality of low quality trajectories pairs further comprises: computing two distance matrices, each corresponding to a predetermined distance measure, where each entry in each matrix contains a distance between a respective pair of low quality trajectories; for each first low quality trajectory: creating two rankings, determined from a respective row or a respective column from each of the two distance matrices; and selecting, according to distributions of values within each of the two rankings, a second low quality trajectory to be paired with the first low quality trajectory.

In a further possible implementation of the first and second aspects of the present invention, optionally, one predetermined distance measure is a metric distance measure, and a second predetermined distance measure is a sequence pattern matching similarity measure.

In a further possible implementation of the first and second aspects of the present invention, optionally, one predetermined distance measure is a Hausdorff distance measure, and a second predetermined distance measure is a longest common subsequence (LCSS) measure.

In a further possible implementation of the first and second aspects of the present invention, optionally, one predetermined distance measure is a Hausdorff distance measure, and a second predetermined distance measure is an improved sequence weighted alignment (ISWALE) measure.

In a further possible implementation of the first and second aspects of the present invention, optionally, the system further comprises a memory configured to store the high and low quality trajectories pairs together with respective confidence values and respective distances.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
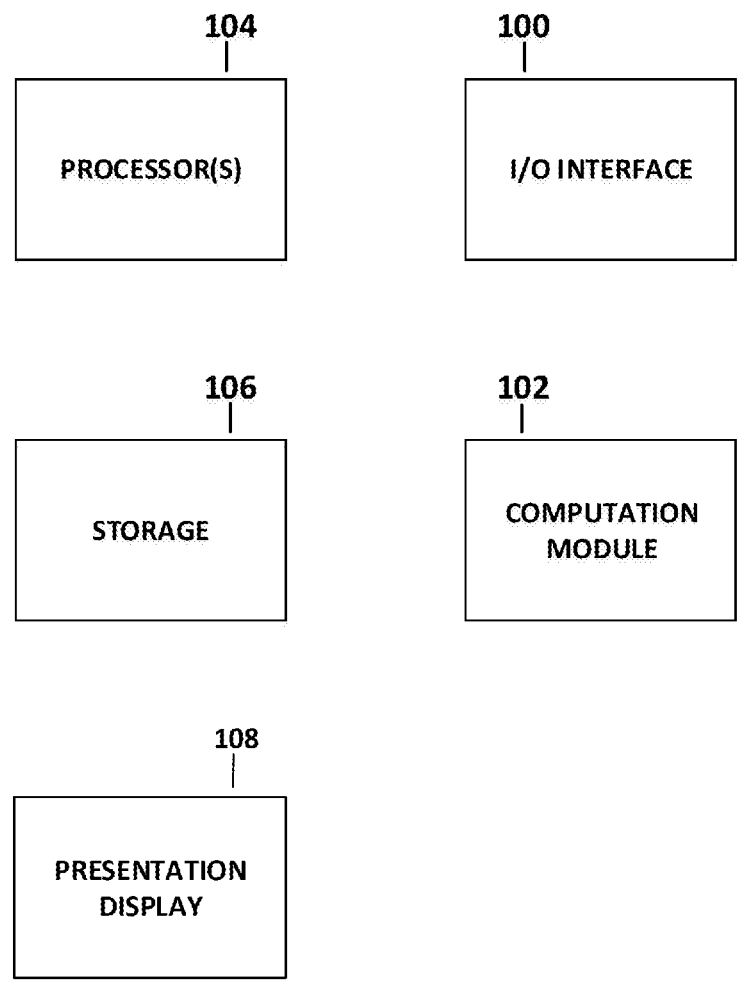
FIG. 1 is an exemplary layout of components in a spatiotemporal trajectory matching system, according to some embodiments of the present invention.

The present invention, in some embodiments thereof, relates to user location tracking and, more specifically, but not exclusively, to user location tracking by location based trajectory matching.

According to some embodiments of the present invention there are provided systems and methods in which processes perform location based trajectory matching of location based trajectories of users originating from a variety of sources.

According to some embodiments of the present invention there is provided a system which applies to location based trajectory matching, and includes a system of iteratively matching a plurality of spatiotemporal trajectories of a plurality of users according to a threshold. The plurality of spatiotemporal trajectories may comprise a plurality of first spatiotemporal trajectories and a plurality of second spatiotemporal trajectories each generated based on location data gathered by a different tracking system. The plurality of first spatiotemporal trajectories may comprise over the top (OTT) trajectories originating from sources such as global navigation satellite system (GNSS) receivers in the user equipment (e.g. GPS receiver) or a location application programming interface (API) (e.g., Google location API that reports user locations based on GPS, wireless networks or network cells), whereas the plurality of second spatiotemporal trajectories may comprise measurement report (MR) trajectories originating from mobile network user locations and may be calculated, for example, by geometric or fingerprint matching algorithms.

Matching OTT and MR trajectories is a difficult problem for several reasons, including not containing the same international mobile subscriber identity (IMSI), having thousands (or millions) of users moving more or less in the same area, thus generating OTT and MR trajectories that can be very similar, and having differing timestamps and sampling rates related to an identical user. Using MR user routes instead of, or in addition to OTT user routes may be a necessary feature of location based applications. For instance, OTT data may depend on infrastructure such as satellite availability, and/or internal and foreign institutional policies. A range of applications may benefit from the system: user localization products (for both indoor and outdoor scenarios), assistive technologies for memory and visually impaired people, tourist-oriented services that enhance user experience in museums and galleries, indoor/outdoor gaming, in-shop advertisements and coupon distributions, as well as health and daily life monitoring applications. For example, in caring for the elderly, allowing a mobile device to automatically determine whether they have deviated from their normal routine can trigger a notification to their carers.

The system described herein may improve known solutions of matching OTT/MR trajectories by structuring and classifying location data into often-traversed routes based on machine learning clustering.

According to some embodiments of the present invention, the system comprises several components which are related in a machine learning based feedback loop for a purpose of improving matchings of OTT/MR trajectories.

According to some embodiments of the present invention, a component comprising a quality classifier is responsible for classifying the plurality of spatiotemporal trajectories received as input, into high quality trajectories and low quality trajectories. Optionally, a threshold may be received as input, for example, from a service provider who uses the system described herein. Optionally, the classifying is performed by evaluation of the trajectories using shape descriptors comprising of measurements of compactness and elongation. The quality classifier may also be responsible for filtering and discarding trajectories by two distinct filters: a first filter for OTT trajectories by using shape descriptors scores, and a second filter for MR trajectories by using temporal data scores.

Optionally, raw OTT/MR trajectories are preprocessed and stored according to a session identifier (sessionID), in order to be transformed into an efficiently computable form.

Optionally, OTT and MR trajectories classified by the quality classifier to be of high quality, are matched using a naïve matching algorithm, whereas OTT and MR trajectories classified by the quality classifier to be of low quality are matched by a matching method based on two distance measures (also known herein as 'similarity measures'), by generating two distance matrices each containing respective distances between low quality OTT and MR trajectories. Note that if two trajectories are more distant then their similarity decreases and vice versa. Therefore, considering that a similarity between two trajectories is interchangeable with a distance by an inverse operation, the terms 'distance' and 'similarity' are interchangeable hereby.

Optionally, one distance measure is a metric measure, such as Hausdorff distance, and a second distance measure is a sequence pattern matching similarity measure such as a longest common subsequence (LCSS) measure, or an improved sequence weighted alignment (ISWALE) measure.

Optionally, the matching method matches each low quality OTT trajectory by creating two rankings for the OTT trajectory, and by examining distributions of MR trajectories within each ranking, the matching method selects an MR trajectory to be matched with the respective OTT trajectory.

Optionally, for each pair of matched OTT/MR trajectories a confidence value is computed, wherein the confidence value represents a disparity of a respective matched pair. According to some embodiments of the present invention, the confidence metric used to compute confidence values may be based on one of: maximum likelihood metric (MLM) and left-right consistency (LC), as described in "A Quantitative Evaluation of Confidence Measures for Stereo Vision" by X. Hu, and P. Mordohai, published at IEEE Transactions on Pattern Analysis and Machine Intelligence, pp 2121-2133, on November, 2012.

Optionally, all matched OTT/MR pairs and associated confidence values are outputted to a system user. The system user may, for example, be a service provider which uses the matched trajectories to locate people in emergencies.

Optionally, a machine learning (ML) process is used to adjust confidence values of at least some of the matched OTT/MR trajectories. According to some embodiments of the present invention, an ML approach based on random decision tree classifiers, also known as Random forest, is used in order to classify matching correctness of at least some of the OTT/MR matched pairs, and an iterative adaptive boosting method known as Adaboost is used to adjust confidence values of matched OTT/MR pairs. Optionally, a convergence condition determines when to cease the confidence value adjustment process.

According to some embodiments of the present invention, OTT and MR trajectories which are part of OTT/MR matched pairs whose adjusted confidence values are below the threshold are re-inputted into the quality classifier for another loop of trajectory matching.

Some embodiments of the present invention may exhibit several advantages which are not exhibited as a group in any prior solutions:
1. Scalability.
2. No requirement for IMSI.
3. Relatively low computational complexity.
4. Robustness to noisy trajectories.
5. Simulations of some embodiments of the present invention achieved an improvement in accuracy and efficiency in comparison to alternative existing approaches. An improvement of at least 10% in accuracy was achieved for all datasets tested, while an improvement by a factor of at least 1.3 was achieved in processing speed in comparison to previously used trajectory matching methods on datasets tested.
6. Some existing solutions partially solve user location tracking scenarios, however each has limitations and drawbacks in comparison to some embodiments of the present invention. Existing solutions include:

A system using positioning unit devices in order to determine user positions in satellite obscure environments. A major drawback of the system is the requirement of availability of such devices.

A system for computing similarities between trajectories, which functions based on a set of geographical locations of interest specified by a user as an input trajectory, calculating a proximal similarity between the set of geographical locations of interest specified by the user and respective sets of geographical locations from GPS logs. A limitation of the system is the limited set of geographical locations for each user.

A system for anomaly detection based on vehicle trajectory similarity, which displays reasonable computational complexity robustness, but performs poorly in case of noisy trajectories.

A system which requires GPS data, which questions its feasibility for a wide range of scenarios, for instance, indoors, or in tunnels.

In "City-Scale Localization with Telco Big Data", by F. Zhu, C. Luo, M. Yuan, Y. Zhu, Z. Zhang, T. Gu, K. Deng, W. Rao, and J. Zeng, published at CIKM '16, Proceedings of the 25th ACM International on Conference on Information and Knowledge Management, pp 439-448, on Oct. 28, 2016, a scalable method is described, however, the scalable method relies on available IMSI for both OTT and MR data.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a depiction of system components in a spatiotemporal trajectory matching system, according to some embodiments of the present invention. The system is used for matching OTT and MR trajectories of users locations that may be used in various applications. For example, an embodiment of the system may be located within a server of a telecom company and/or partially implemented as a cloud service, and which may input data into an application for locating disabled or elderly people in emergencies.

The system includes an I/O interface 100 which may receive OTT trajectories, MR trajectories, and the threshold, and may output matched OTT/MR pairs and associated confidence values. The system includes a computation module 102, which is responsible for the functionality of iteratively matching the plurality of OTT and MR trajectories according to the threshold. Optionally, the system includes at least one processor 104 to execute instructions originating in the computation module. Optionally, the system includes a storage 106 in order to store data such as OTT and MR trajectories, confidence values, and data computed during the matching of OTT and MR trajectories. Optionally, the system includes a presentation display 108, for displaying results of OTT/MR trajectory matchings and/or outputs regarding user requests. Optionally, outputs directed from the computation module to the I/O interface are outputted to the presentation display. It is assumed that the various system components may be implemented as software and/or firmware.

Figure 2:
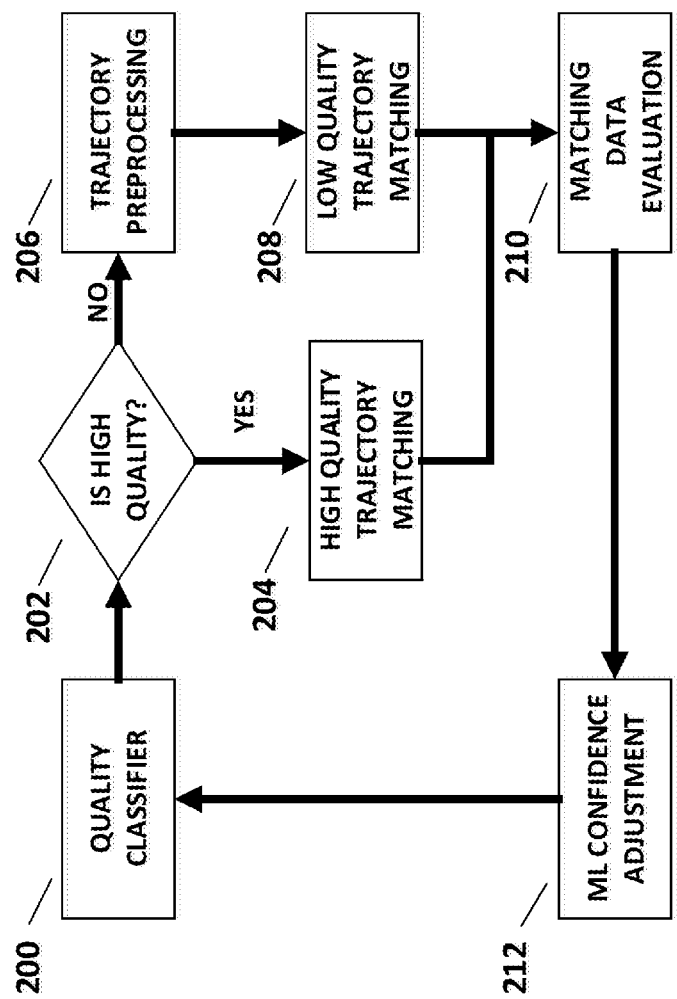
FIG. 2 is an exemplary depiction of dataflow between submodules of the computation module, according to some embodiments of the present invention.

Reference is also made to FIG. 2, which depicts dataflow between submodules of the computation module, according to some embodiments of the present invention. Optionally, the quality classifier 200 receives data comprising of OTT and MR trajectories and user preferences through the I/O interface 100, as seen in FIG. 1. The quality classifier may classify OTT and MR trajectories into high quality and low quality trajectories. The quality classifier may use a designated filter for low quality OTT and MR trajectories in order to prune and discard trajectories which are of very low quality. Next, as shown in 202, high and low quality trajectories are separated. As shown in 204, high quality trajectories are inputted into a high quality trajectory matching submodule. According to some embodiments of the present invention, the high quality trajectory matching submodule employs a matching process comprising one of longest common subsequence (LCSS), edit distance on real sequence (EDR), or edit distance with real penalty (ERP) functions, as described in "Robust and fast similarity search for moving object trajectories" by L. Chen, M. T. Özsu, and V. Oria, Published at SIGMOD'05, pp 491-502, on Jun. 14, 2005, wherein selecting which sequence pattern matching similarity measure to use may depend on qualities of the measures in relation to noise present and/or other known qualities of received trajectories.

Optionally, low quality OTT and MR trajectories are inputted into a trajectory preprocessing submodule 206, which transforms raw OTT and MR trajectories data formats into easier computable forms. For example, OTT and MR trajectories may be received in a raw text format given as: (sessionID,timestamp$_i$,longitude$_i$,latitude$_i$) i=1 . . . N, where N is an arbitrary number of points in a trajectory. According to some embodiments of the present invention, in order to increase efficiency, as MR data volume may be very large, trajectories are grouped by sessionID and saved to files using the storage 106 in Javascript object notation (JSON) format. The trajectory preprocessing may be performed using off the shelf applications.

Optionally, the trajectory preprocessing submodule inputs the preprocessed low quality OTT and MR trajectories into a low quality trajectory matching submodule 208, according to respective sessionID values, which proceeds to match low quality OTT and MR trajectories. Optionally, the low quality trajectory matching submodule inputs matched OTT/MR pairs into a matching data evaluation submodule 210, which computes a confidence value for each matched OTT/MR trajectory pair, whereas the confidence values may be computed from MLM or LC measures. The low quality trajectory matching submodule may use the storage 106 in order to store all matched OTT/MR pairs and respective confidence values. In addition, the matching data evaluation submodule may output upon request of a system user matched OTT/MR pairs and respective confidence values though the I/O interface 100. The trajectory data storage submodule may input matched OTT/MR pairs and respective confidence values into an ML confidence adjustment submodule 212, which uses an ML process in order to adjust confidence values. According to some embodiments of the present invention, the ML process iteratively classifies OTT/MR matched pairs according to respective confidence values, adjusts confidence values according to the classifying, and checks the adjusted confidence values for a convergence condition. The ML process may proceed to re-input OTT and MR trajectories which are part to matched OTT/MR pairs whose adjusted confidence values are below the threshold, in order to be re-matched in a new matching cycle. Optionally, the system may be set to perform matching cycles until a predetermined condition is met, for example, until all OTT trajectories are matched, or until a predetermined number of matching cycles, or until a percentage of OTT/MR matched pairs confidence values are above the threshold.

Figure 3:
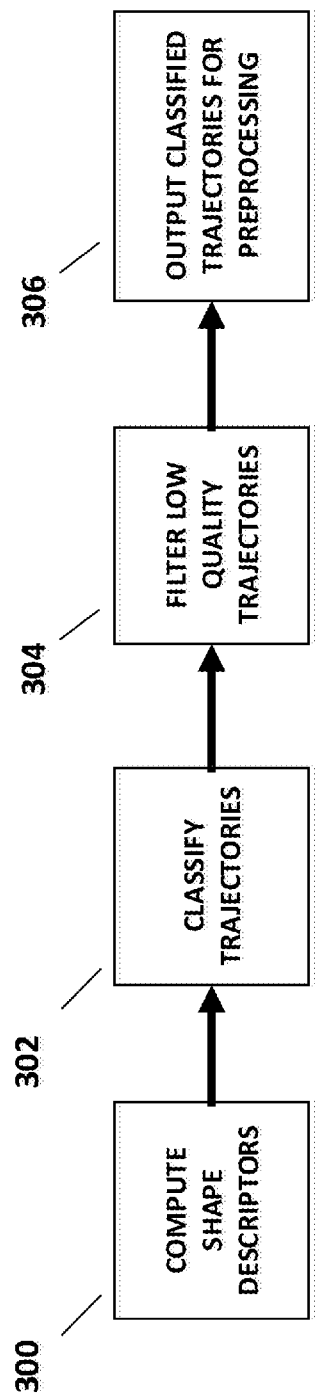
FIG. 3 is an exemplary depiction of dataflow between the quality classifier components, according to some embodiments of the present invention.

Reference is also made to FIG. 3, which depicts dataflow between the quality classifier components, according to some embodiments of the present invention. As shown at 300, the quality classifier computes shape descriptor scores for each OTT and MR trajectory.

Optionally, the shape descriptors used are compactness and elongation functions defined as follows. A trajectory t is given as a sequence of two dimensional coordinates, each with a time stamp, and therefore can be mapped geometrically as a line. Compactness of t, denoted hereby as C(t) measures a density, or how closely packed a shape is, where a circle is the most compact possible shape with a compactness of 1, and is defined as:

$$C(t) = \frac{P^2}{4\pi S},$$

where P denotes a perimeter of t defined as the number of trajectory points defining t, and S denotes an area under the geometric shape mapped by t, (i.e. an integral of t). An elongation of t, hereby denoted as E(t), measures how distinctly orientated the geometric shape mapped by t is, and is defined as:

$$E(t) = \frac{\sum_{i=1}^{n} e_i + \sqrt{\left(\sum_{i=1}^{n} |e_i|\cos(2a_i)\right)^2 + \left(\sum_{i=1}^{n} |e_i|\sin(2a_i)\right)^2}}{\sum_{i=1}^{n} e_i - \sqrt{\left(\sum_{i=1}^{n} |e_i|\cos(2a_i)\right)^2 + \left(\sum_{i=1}^{n} |e_i|\sin(2a_i)\right)^2}},$$

where $e_i$ denote edges of a polygonal shape comprising the geometric mapping of t, and $\alpha_i$ denote angles between respective edges of the polygonal shape and the x-axis.

Next, as shown in 302, the quality classifier classifies OTT and MR trajectories according to a heuristic, which according to some embodiments of the present invention, classifies a given OTT trajectory q and MR trajectory r as follows:

If $C(q) \geq \sqrt{E(q)}$ classify $q$ as low quality, else classify $q$ as high quality.

If $E(r) \geq \sqrt{C(r)}$ classify $r$ as low quality, else classify $r$ as high quality.

Next referenced is 304, in which low quality trajectories are filtered according to the first and second filters, and are discarded if found to be of very low quality, and as shown in 306, classified OTT and MR trajectories which are not discarded may be outputted from the quality classifier to the pre-processing module 202.

Figure 4:
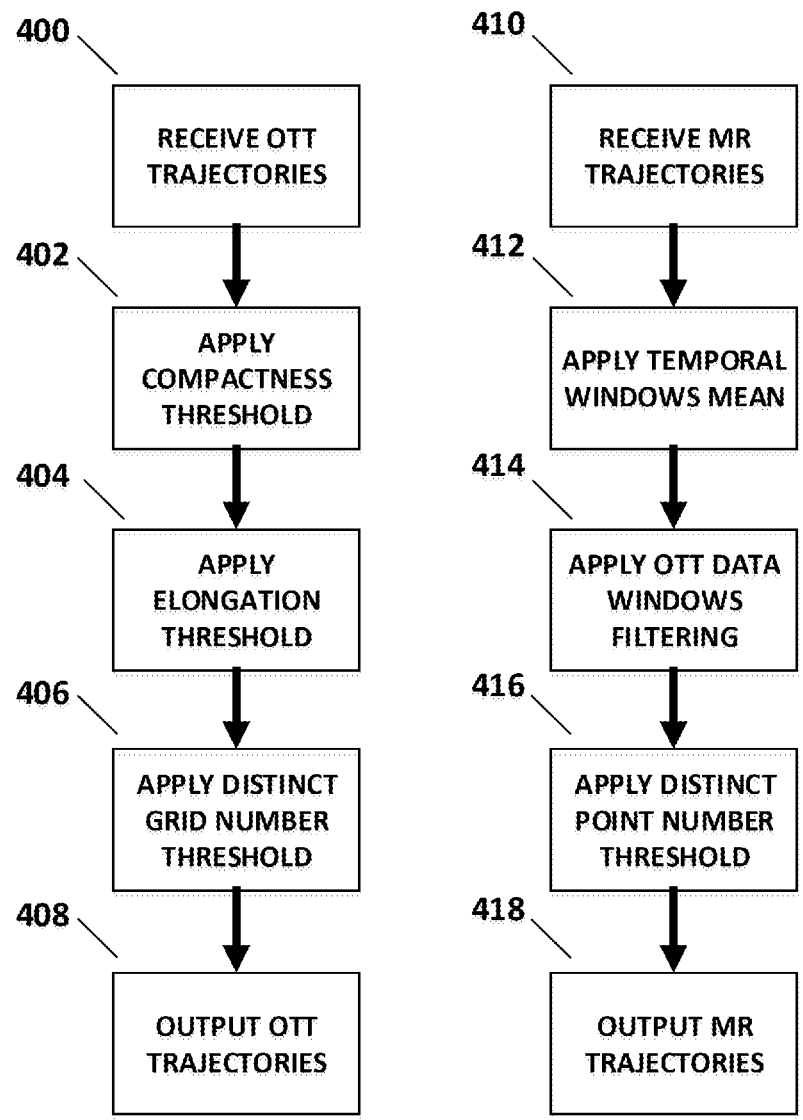
FIG. 4 is an exemplary dataflow of a depiction of the first and second filters for OTT and MR trajectories respectively, according to some embodiments of the present invention.

Reference is also made to FIG. 4, which is an exemplary dataflow of the first and second filters for OTT and MR trajectories respectively, as depicted in 304. As shown in 400, OTT trajectories may be inputted into the OTT filter one by one, and as shown in 402, a predefined compactness threshold may be applied to C. If a current trajectories compactness is higher than the compactness threshold, then as shown in 404 a predefined elongation threshold may be applied to E. If the current trajectories elongation is higher than the elongation threshold, then as shown in 406 a predefined distinct grid number threshold may be applied, which comprises counting a number of trajectory coordinates within equally sized square grids, and if the current trajectory coordinates occupy a number of grids smaller than the distinct grid number the trajectory is not discarded and outputted as shown in 408.

Next, as shown in 410, MR trajectories may be inputted into the MR filter one by one, and as shown in 412, temporal windows mean may be applied to a current MR trajectory. The temporal windows mean functions by sliding a temporal window of which size is predefined, and replacing all MR trajectory points within the temporal window by their mean value. This is performed in order to increase robustness and processing speed. Next, as shown in 414, OTT data windows filtering may be applied to the current MR trajectory, which comprises filtering out points of the current MR trajectory which are not within any time intervals of predefined size of any OTT data points of OTT trajectories with an identical sessionID as the current MR trajectory. Next, as shown in 416, a distinct point number threshold is applied, which according to some embodiments of the present invention, comprises discarding all MR trajectories who do not contain at least two points, and the last step, as shown in 418, comprises outputting all remaining MR trajectories.

Figure 5:
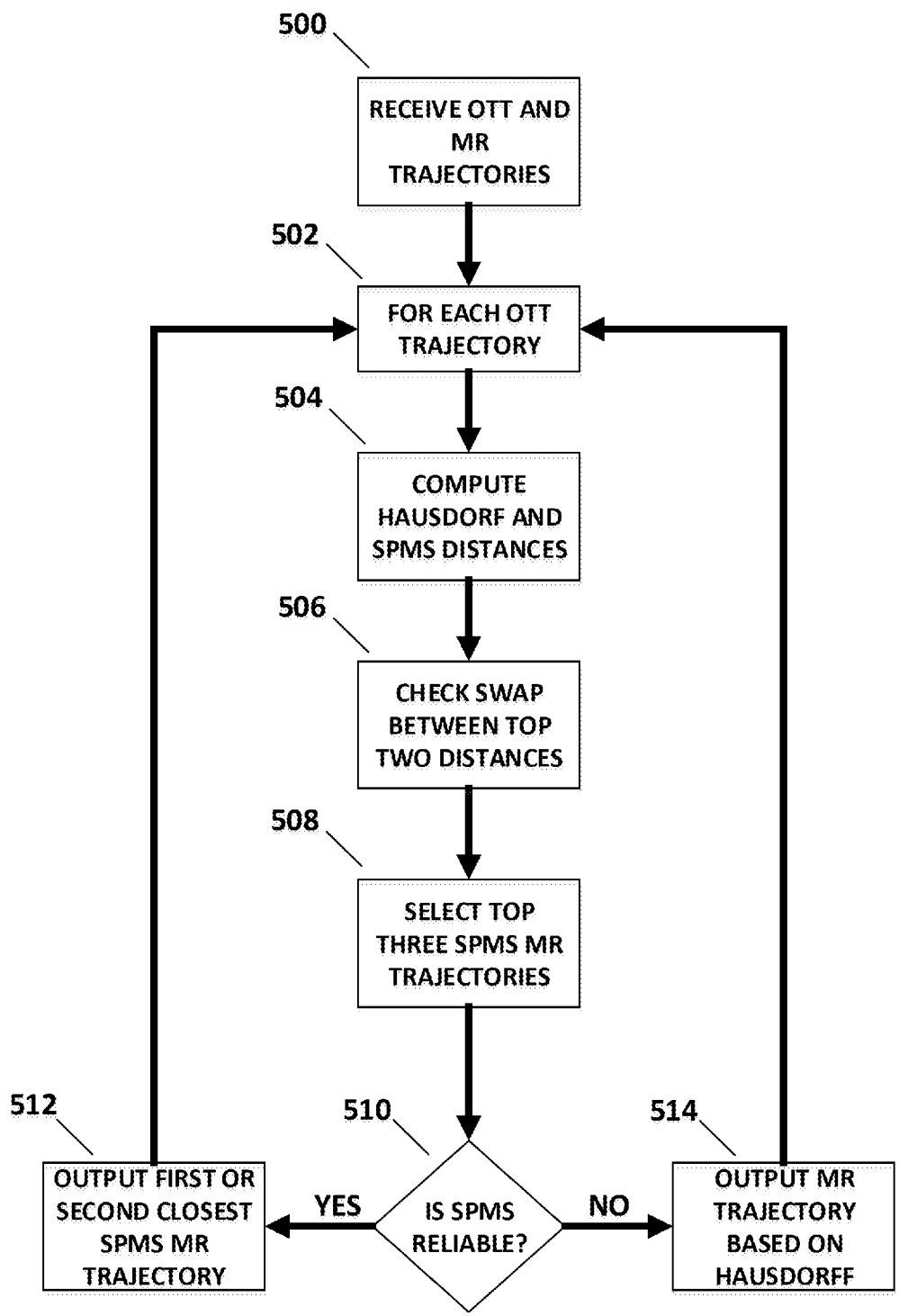
FIG. 5 is an exemplary dataflow of the low quality trajectory matching submodule, according to some embodiments of the present invention.

Reference is next made to FIG. 5 which depicts an embodiment of the low quality trajectory matching submodule, which includes a pre-fusion process, and a fusion process, using two distance measures which comprise a metric distance measure, and a sequence pattern matching similarity (SPMS) measure. According to some embodiments of the present invention, the metric measure comprises a Hausdorff distance measure, which while not being a distance by mathematical definition, the Hausdorff distance measures a similarity between sets, and is defined as: $d_H(X,Y)=\max\{\sup_{x\in X}(\inf_{y\in Y}(d(x,y))),\inf_{x\in X}(\sup_{y\in Y}(d(x,y)))\}$, where X,Y denote sets, d denotes a pointwise distance metric such as Euclidean distance, and inf,sup denote infimum and supremum functions respectively. An OTT and MR pair of trajectories may display topological similarities from a Hausdorff distance perspective but not look similar from a sequence matching perspective and vice versa, hence a merging of the two distance measures may match correctly noisy OTT and MR trajectories.

Reference is now made to FIG. 5, which according to some embodiments of the present invention, is an exemplary dataflow of the low quality trajectory matching submodule 208. As shown in 500, the low quality trajectory matching submodule may receive unmatched OTT and MR trajectories from the trajectory preprocessing submodule 202, and as shown in 502, for each OTT trajectory a matching process may be applied. Next, as shown in 504, Hausdorff and SPMS distances may be computed between the current OTT trajectory and all MR trajectories with an identical sessionID. Optionally, as shown in 506, the two nearest MR trajectories to the current OTT trajectory, denoted as $OTT_{Curr}$ according to Hausdorff and SPMS distances are checked as follows. Denote by $K_H$, $K_{SPMS}$, two predefined constants, and by $MR_1^H$, $MR_2^H$, $MR_1^{SPMS}$, $MR_2^{SPMS}$, the nearest and second nearest MR trajectories according to Hausdorff and SPMS respectively, then according to some embodiments of the present invention, the following pseudocode is executed:

If $(|d_H(OTT_{Curr},MR_1^H)-d_H(OTT_{Curr},MR_2^H|\le K_H)$ and $(C(MR_2^H)\ge C(MR_2^H))$ then swap $MR_1^H$ and $MR_2^H$ If $(|d_{SPMS}(OTT_{Curr},MR_1^{SPMS})-d_{SPMS}(OTT_{Curr}, MR_2^{SPMS})|\le K_{SPMS})$ and $(C(MR_2^{SPMS})\ge C(MR_2^{SPMS}))$ then swap $MR_1^{SPMS}$ and $MR_2^{SPMS}$ The logic being, that if the two nearest MR trajectories are both close to $OTT_{Curr}$, and the second closest trajectory is more compact than the closest trajectory, then the second closest trajectory is preferred.

Optionally, as next shown in 508, for each OTT trajectory the three closest MR trajectories according to the SPMS distance are selected, and as shown in 510 a reliability check is executed. According to some embodiments of the present invention, the reliability check examines the SPMS distance distribution between the current OTT trajectory and the selected MR trajectories. If the selected MR trajectories are closely packed, SPMS is deemed unreliable. Denote by $R_1$, $R_2$ two predetermined constants, then according to some embodiments of the present invention, SPMS is deemed reliable if and only if:

$(|d_{SPMS}(OTT_{Curr},MR_1^{SPMS})-d_{SPMS}(OTT_{Curr}, MR_2^{SPMS})|>R_1)$ or $(|d_{SPMS}(OTT_{Curr},MR_2^{SPMS})-d_{SPMS}(OTT_{Curr}, MR_3^{SPMS})|>R_2)$ Optionally, if the SPMS measure is deemed reliable, as shown in 512, the following pseudocode is executed:

if $(|d_{SPMS}(OTT_{Curr},MR_1^{SPMS})-d_{SPMS}(OTT_{Curr}, MR_2^{SPMS})|>R_1)$ output $MR_1^{SPMS}$ else output $MR_2^{SPMS}$ According to some embodiments of the present invention, if the SPMS measure is deemed unreliable, as shown in 514, denote by $q, D_q$, two predetermined constants, and the following pseudocode is executed:

select q nearest MR trajectories to the current OTT trajectory for which $(|d_{SPMS}(OTT_{Curr},MR_i^{SPMS})-d_{SPMS}(OTT_{Curr},MR_i^{SPMS})|<D_q$, $i=1 \ldots T)$ and output an MR trajectory $MR_j^{SPMS}$ for which $d_H(OTT_{Curr},MR_j^{SPMS})$ is minimal According to some embodiments of the present invention, the SPMS measure may consist of an LCSS measure or an ISWALE measure.

For two strings R, S, The LCSS measure is defined recursively as:

$$LCSS(R, S) = \begin{cases} 0, & \text{if } m = 0 \text{ or } n = 0 \\ LCSS(rest(R), rest(S)) + 1, & \text{if } \forall d, |r_{d,1} - s_{d,1}| < \varepsilon \\ \max\{LCSS(rest(R), S, LCSS(R, rest(S))\}, & \text{otherwise} \end{cases}$$

Wherein ε serves as a similarity threshold, meaning distances between corresponding trajectories points which are smaller than E increase similarity by 1.

Optionally, the SPMS measure is implemented as an improved SWALE measure. Unlike the LCSS measure, SWALE rewards or penalizes computed distances between trajectories in accordance with a predefined threshold E, the logic being that if E is appropriately selected SWALE may strongly separate correctly matched pairs and incorrectly matched pairs by increasing the difference in similarity scores. The ISWALE measure takes into account temporal as well as spatial dimensions in calculating a similarity between two trajectories R,S. The ISWALE measure calculates rewards and penalties based on predefined spatial and temporal intervals for different Euclidean distances between OTT and MR trajectory points within spatial and temporal dimensions.

The ISWALE is defined as follows:

Denote by $R=(r_1 \ldots r_m)$, $S=(s_1 \ldots s_m)$ and rest(R) as R with a first coordinate removed. Denote by RD a reward, by PMR an MR penalty, by POTT an OTT penalty, and by $C_i$, $i=1 \ldots 4$ four predetermined constants, which according to some embodiments of the present invention, are equal to 9, 15, 30, 40 respectively. Denote by $T(r_i)$ a temporal stamp of $r_i$. Denote by ε, ω, E, Ω, a lower spatial threshold, a lower temporal threshold, an upper spatial threshold, and an upper temporal threshold respectively. Denote by $F_i$:

$F_i=\max\{SWALE(rest(R),S)+POTT,SWALE(R,rest(S),R)+PMR\times C_i\}$, $i=1, \ldots, 4$ Then:

$$ISW\ ALE(R, S) = \begin{cases} m = 0: n \times PMR,\ n = 0: m \times PMR, \\ |r_1 - s_1| < \varepsilon, |T(r_1) - T(r_1)| < \omega: \\ \quad SWALE(rest(R), rest(S)) + RD \\ |r_1 - s_1| < \varepsilon, \omega < |T(r_1) - T(r_1)| < \Omega: F_1 \\ \varepsilon < |r_1 - s_1| < E, |T(r_1) - T(r_1)| < \omega: F_2 \\ \varepsilon < |r_1 - s_1| < E, \omega < |T(r_1) - T(r_1)| < \Omega: F_3 \\ E < |r_1 - s_1|, \Omega < |T(r_1) - T(r_1)|: F_4 \end{cases}$$

Figure 6:
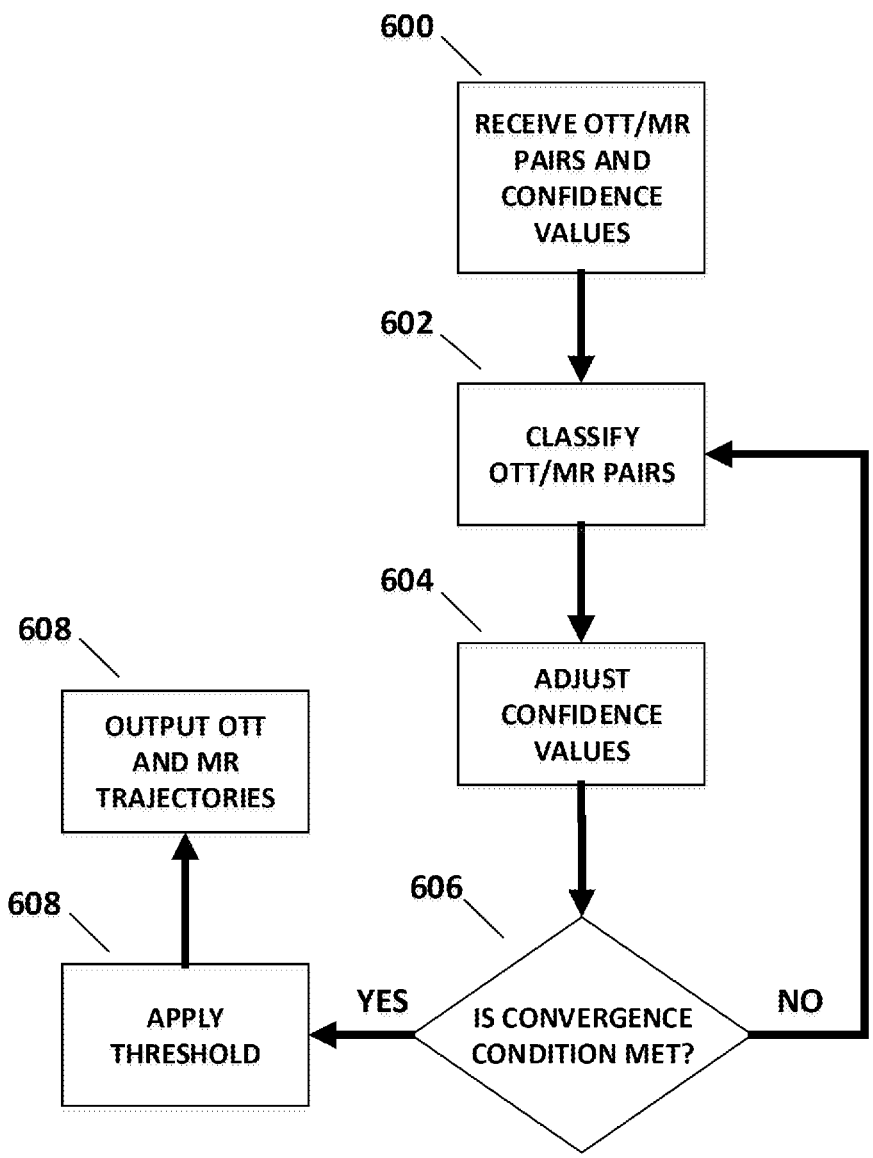
FIG. 6 is an exemplary dataflow between components of the ML confidence adjustment submodule, according to some embodiments of the present invention.

Next, reference is made to FIG. 6, which is an exemplary dataflow between components of the ML confidence adjustment submodule 212. According to some embodiments of the present invention, the ML confidence adjustment submodule implements an Adaboost method (adaptive boosting) on a random forest dataset. According to some embodiments of the present invention, the ML confidence adjustment submodule executes iterations in which OTT/MR pairs are classified according to respective confidence values, and the classifying is used to adjust confidence values.

According to some embodiments of the present invention, as shown in 600, matched OTT/MR pairs and respective confidence values are received by the ML confidence adjustment submodule. Optionally, as shown in 602, OTT/MR pairs are classified according to their respective confidence values using a combination of Adaboost and Random forest. Next, as shown in 604, confidence values may be adjusted according to the results of the classifying. For example if an OTT/MR pair is classified similarly to other OTT/MR pairs which have relatively high confidence values then the confidence value of the OTT/MR pair may be adjusted upwards. Optionally, following the adjustment of confidence values, as seen in 606, a convergence condition is checked. If there are currently adjusted confidence values which do not meet the convergence condition then another iteration is performed by reclassification at 602, and if all adjusted confidence values meet the convergence condition then the threshold may be applied, as shown in 608. The application of the threshold may consist of filtering all OTT and MR trajectories which are part of OTT/MR matched pairs for which respective adjusted confidence values are below the threshold. Optionally, as shown in 610, OTT and MR trajectories which remain after the filtering may be outputted by re-inputting them into the quality classifier for another iteration of trajectory matching.

Figure 7:
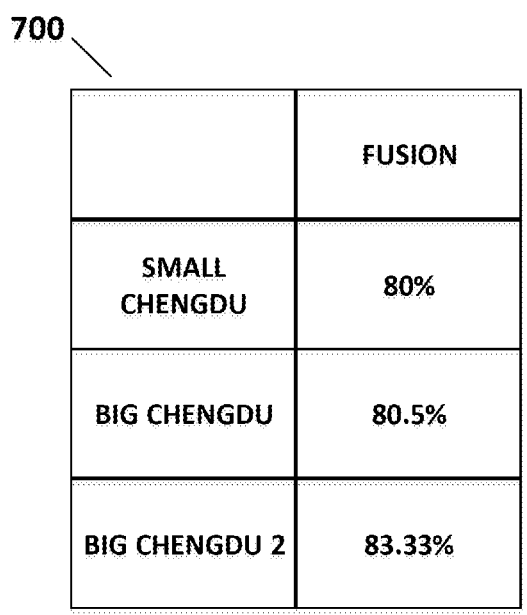
FIG. 7 is a depiction of results of simulations of some embodiments of the present invention.

Reference is also made to FIG. 7, which depicts results of simulations of some embodiments of the present invention. Three datasets were tested, named small Chengdu, big Chengdu, and big Chengdu 2. Small Chengdu consisted of 16,000 raw OTT trajectories and 310,000 raw MR trajectories. Big Chengdu consisted of 180,000 Raw OTT trajectories and 3,300,000 Raw MR trajectories, and big Chengdu 2 consisted of 40,300 Raw OTT trajectories and 1,740,000 Raw MR trajectories.

As seen in 700, percentages of correct OTT/MR matchings are displayed in a table. A fusion approach similar to that which is depicted FIG. 5 performed considerably better in all three datasets in comparison to the ISWALE or Hausdorff measures alone.

According to some embodiments of the present invention, an application may receive a user request, for example a guardian for an elderly and/or sick person may report the person missing via a mobile phone application, whereas the mobile phone application may contact a server, which may be a computer terminal and/or a cloud application. The server may select from the data storage 106, known OTT trajectories associated to an account of the missing person, and next the server may match the known OTT trajectories to MR trajectories tracked within a certain timeframe, using the computation module 102. Next, the server may process matched OTT trajectories in order to describe the matched OTT trajectories in terms of known landmarks. Finally, the server may output the known landmarks to the presentation display 108, for example, to a laptop screen and/or phone screen belonging to the guardian. For example, the missing person may have been in locations with a blocked GPS signal, or may have a phone with no GPS feature, but may still be located due to MR signals being tracked.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term trajectory matching is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A system for iteratively matching a plurality of spatiotemporal trajectories of a plurality of users according to a threshold, wherein the system comprises at least one processor, one or more memories, and a quality classifier, and wherein the one or more memories are coupled to the at least one processor and store programming instructions for execution by the at least one processor to:
   receive a plurality of first spatiotemporal trajectories and a plurality of second spatiotemporal trajectories, wherein each of the plurality of first spatiotemporal trajectories and the plurality of second spatiotemporal trajectories is generated based on location data gathered by a different tracking system; and
   the quality classifier being configured to:
      classify the plurality of first spatiotemporal trajectories into first low quality trajectories and first high quality trajectories, and classify the plurality of second spatiotemporal trajectories into second low quality trajectories and second high quality trajectories; and
   wherein the programming instructions are for execution by the at least one processor to:
      identify a plurality of high quality trajectories pairs by matching between the first high quality trajectories and the second high quality trajectories;
      identify a plurality of low quality trajectories pairs by matching between the first low quality trajectories and the second low quality trajectories;
      associate each of the plurality of low quality trajectories pairs and each of the plurality of high quality trajectories pairs with a confidence value indicative of a disparity of a respective pair;
      adjust a plurality of confidence values of at least two of the plurality of low quality trajectories pairs and the plurality of high quality trajectories pairs; and
      re-input the plurality of spatiotemporal trajectories into the quality classifier, wherein the plurality of spatiotemporal trajectories are part of the low quality trajectories pair or the high quality trajectories pair whose adjusted confidence value is below the threshold.

2. The system of claim 1, wherein the programming instructions are for execution by the at least one processor further to output the plurality of high quality trajectories pairs, the plurality of low quality trajectories pairs, and respective confidence values.

3. The system of claim 1, wherein classifying the plurality of first spatiotemporal trajectories and the plurality of second spatiotemporal trajectories comprises:
   computing, for each of the plurality of first and second spatiotemporal trajectories, a confidence value and a shape descriptor score; and
   using a predetermined heuristic to combine the shape descriptor score for each of the plurality of first and second spatiotemporal trajectories.

4. The system of claim 1, wherein adjusting the plurality of confidence values of the at least two of the plurality of low quality trajectories pairs and the plurality of high quality trajectories pairs comprises:
   executing a machine learning process on the plurality of low quality trajectories pairs and the plurality of high quality trajectories pairs.

5. The system of claim 4, wherein the machine learning process comprises an iterative process of:
   using a classifier to classify the plurality of high and low quality trajectories pairs according to respective confidence values;
   adjusting the confidence values of the plurality of the high and low quality trajectories pairs according to the classifying;
   checking a convergence condition on each of the adjusted confidence value; and
   outputting the adjusted confidence values in response to the convergence condition being met on the adjusted confidence values.

6. The system of claim 1, wherein the quality classifier is further configured to:
   perform an evaluation of the first low quality trajectories by a first filter having a sequence of shape descriptor scores; and
   discard trajectories from the first low quality trajectories based on the evaluation.

7. The system of claim 1, wherein the quality classifier is further configured to:
   perform an evaluation of the second low quality trajectories by a second filter having a sequence of temporal data scores; and
   discard trajectories from the second low quality trajectories based on the evaluation.

8. The system of claim 1, wherein identifying the plurality of low quality trajectories pairs comprises:
   computing two distance matrices, wherein each of the two distance matrices is corresponding to a predetermined distance measure and comprises a distance between a respective pair of low quality trajectories;
   for each of the first low quality trajectory, creating two rankings, determined from a respective row or a respective column from each of the two distance matrices; and
   for each of the first low quality trajectory, selecting, according to distributions of values within each of the two rankings, a second low quality trajectory to be paired with the first low quality trajectory.

9. The system of claim 8, wherein a first predetermined distance measure is a metric distance measure, and a second predetermined distance measure is a sequence pattern matching similarity measure.

10. The system of claim 9, wherein the first predetermined distance measure is a Hausdorff distance measure, and the second predetermined distance measure is a longest common subsequence (LCSS) measure.

11. The system of claim 9, wherein the first predetermined distance measure is a Hausdorff distance measure, and the second predetermined distance measure is an improved sequence weighted alignment (ISWALE) measure.

12. The system of claim 1, wherein the system further comprises a memory configured to store the plurality of high and low quality trajectories pairs together with respective confidence values and respective distances.

13. A method of iteratively matching a plurality of spatiotemporal trajectories of a plurality of users according to a threshold, comprising:
receiving a plurality of first spatiotemporal trajectories and a plurality of second spatiotemporal trajectories, wherein each of the plurality of first spatiotemporal trajectories and the plurality of second spatiotemporal trajectories is generated based on location data gathered by a different tracking system;
classifying, using a quality classifier, the plurality of first spatiotemporal trajectories into first low quality trajectories and first high quality trajectories, and classify the plurality of second spatiotemporal trajectories into second low quality trajectories and second high quality trajectories;
identifying a plurality of high quality trajectories pairs by matching between the first high quality trajectories and the second high quality trajectories;
identifying a plurality of low quality trajectories pairs by matching between the first low quality trajectories and the second low quality trajectories;
associating each of the plurality of low quality trajectories pairs and each of the plurality of high quality trajectories pairs with a confidence value indicative of a disparity of a respective pair;
adjusting a plurality of confidence values of at least two of the plurality of low quality trajectories pairs and the plurality of high quality pairs; and
re-inputting the plurality of spatiotemporal trajectories into the quality classifier, wherein the plurality of spatiotemporal trajectories are part of the low quality trajectories pair or the high quality trajectories pair whose adjusted confidence value is below the threshold.

14. The method of claim 13, further comprising:
outputting the plurality of high quality trajectories pairs, the plurality of low quality trajectories pairs, and respective confidence values.

15. The method of claim 13, wherein classifying the plurality of first spatiotemporal trajectories and the plurality of second spatiotemporal trajectories comprises:
computing for each of the plurality of first and second spatiotemporal trajectories, a confidence value and a shape descriptor score for each of the plurality of first and second spatiotemporal trajectories.

16. The method of claim 13, wherein adjusting the plurality of confidence values of the at least two of the plurality of low quality trajectories pairs and the plurality of high quality trajectories pairs comprises:
executing a machine learning process on the plurality of low quality trajectories pairs and the plurality of high quality trajectories pairs.

17. The method of claim 16, wherein the machine learning process comprises an iterative process of:
using a classifier to classify the plurality of high and low quality trajectories pairs according to respective confidence values;
adjusting the confidence values of the plurality of the high and low quality trajectories pairs according to the classifying;
checking a convergence condition on each of the adjusted confidence value; and outputting the adjusted confidence values in response to the convergence condition being met on the adjusted confidence values.

18. The method of claim 13, further comprising:
performing an evaluation of the first low quality trajectories by a first filter having a sequence of shape descriptor scores; and
discarding trajectories from the first low quality trajectories based on the evaluation.

19. The method of claim 13, further comprising:
performing an evaluation of the second low quality trajectories by a second filter having a sequence of temporal data scores; and
discarding trajectories from the second low quality trajectories based on the evaluation.

20. The method of claim 13, wherein identifying the plurality of low quality trajectories pairs comprises:
computing two distance matrices, wherein each of the two distance matrices is corresponding to a predetermined distance measure and comprises a distance between a respective pair of low quality trajectories;
for each of the first low quality trajectory, creating two rankings, determined from a respective row or a respective column from each of the two distance matrices; and
for each of the first low quality trajectory, selecting, according to distributions of values within each of the two rankings, a second low quality trajectory to be paired with the first low quality trajectory.

* * * * *

UNITED STATES PATENT AND TRADEMARK OFFICE
CERTIFICATE OF CORRECTION

PATENT NO. : 11,889,382 B2
APPLICATION NO. : 17/231856
DATED : January 30, 2024
INVENTOR(S) : Milan Redzic, Christos Laoudias and Gaohu Wang Page 1 of 1

It is certified that error appears in the above-identified patent and that said Letters Patent is hereby corrected as shown below:

On the Title Page

Column 2 (Abstract), Line 12, after "quality" insert therefore -- trajectories --;

Column 2 (Abstract), Line 16, after "quality" insert therefore -- trajectories --;

In the Claims

Column 17, Line 34, Claim 13, after "quality" insert therefore -- trajectories --;

Column 18, Line 1, Claim 15, after "shape descriptor score" insert therefore -- ; and using a predetermined heuristic to combine the shape descriptor score --.

Signed and Sealed this
Eleventh Day of June, 2024

Katherine Kelly Vidal
*Director of the United States Patent and Trademark Office*